United States Patent
Okita

(10) Patent No.: US 8,548,250 B2
(45) Date of Patent: Oct. 1, 2013

(54) INFORMATION PROCESSING APPARATUS AND INFORMATION PROCESSING METHOD

(75) Inventor: Kunio Okita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 919 days.

(21) Appl. No.: 12/670,129

(22) PCT Filed: Nov. 5, 2008

(86) PCT No.: PCT/JP2008/070538
§ 371 (c)(1),
(2), (4) Date: Jan. 22, 2010

(87) PCT Pub. No.: WO2009/060980
PCT Pub. Date: May 14, 2009

(65) Prior Publication Data
US 2010/0189360 A1   Jul. 29, 2010

(30) Foreign Application Priority Data
Nov. 9, 2007  (JP) ................ 2007-292311

(51) Int. Cl.
*G06K 9/48* (2006.01)

(52) U.S. Cl.
USPC ............ 382/197; 382/173; 382/176; 382/190

(58) Field of Classification Search
USPC ................... 382/173, 176, 190, 197
See application file for complete search history.

(56) References Cited

U.S. PATENT DOCUMENTS

| | | | | |
|---|---|---|---|---|
| 5,050,222 A | * | 9/1991 | Lee | 382/176 |
| 5,787,414 A | * | 7/1998 | Miike et al. | 715/243 |
| 6,798,906 B1 | * | 9/2004 | Kato | 382/176 |
| 7,706,610 B2 | * | 4/2010 | Zhang et al. | 382/173 |
| 7,911,503 B2 | * | 3/2011 | Kobayashi | 348/222.1 |
| 2002/0001398 A1 | * | 1/2002 | Shimano et al. | 382/104 |
| 2002/0064307 A1 | * | 5/2002 | Koga et al. | 382/176 |
| 2003/0037059 A1 | * | 2/2003 | Yang | 707/102 |
| 2006/0210165 A1 | * | 9/2006 | Takemoto et al. | 382/190 |
| 2007/0116365 A1 | * | 5/2007 | Kloer | 382/190 |
| 2007/0236499 A1 | * | 10/2007 | Mihara et al. | 345/441 |

FOREIGN PATENT DOCUMENTS

| | | |
|---|---|---|
| JP | 3001950 | 11/1999 |
| JP | 3586911 | 8/2004 |
| JP | 2005 190439 | 7/2005 |
| JP | 2006 331146 | 12/2006 |

* cited by examiner

*Primary Examiner* — Vu Le
*Assistant Examiner* — Aklilu Woldemariam
(74) *Attorney, Agent, or Firm* — Oblon, Spivak, McClelland, Maier & Neustadt, L.L.P.

(57) ABSTRACT

An information processing apparatus is disclosed, including: a reading part reading vector information included in an electronic file; a first line segment extraction part extracting line segment parameter information of a line object from the vector information; a second line segment extraction part extracting polygon parameter information of a polygon object from the vector information and extracting the line segment parameter information of line segments forming the polygon object from the extracted polygon parameter information; a rectangle extraction part extracting rectangle parameter information based on the line segment parameter; a minimum rectangle determination part determining whether or not a rectangle formed based on the rectangle parameter information is a minimum rectangle which does not connote other rectangles; and a minimum rectangle output part outputting the minimum rectangle.

20 Claims, 14 Drawing Sheets

FIG.2

| | OPERATOR | PARAMETERS | | | |
|---|---|---|---|---|---|
| 201 | BT (START OF TEXT OBJECT) | 10 (x COORDINATE) | 10 (y COORDINATE) | QUADRANGLE 1 (STRING TO BE WRITTEN) | |
| | ET (END OF TEXT OBJECT) | | | | |
| 202 | re (RECTANGLE) | 10 (x COORDINATE) | 50 (y COORDINATE) | 100 (WIDTH) | 50 (HEIGHT) |
| | BT (START OF TEXT OBJECT) | 10 | 110 | QUADRANGLE 2 | |
| | ET (END OF TEXT OBJECT) | | | | |
| | re (RECTANGLE) | 10 | 150 | 150 | 1 |
| | re (RECTANGLE) | 160 | 150 | 1 | 30 |
| | re (RECTANGLE) | 160 | 180 | -150 | 1 |
| | re (RECTANGLE) | 10 | 180 | 1 | -30 |
| 203 | l (LINE SEGMENT) | 10 (x COORDINATE OF START POINT) 110 (x COORDINATE OF END POINT) | 200 (y COORDINATE OF START POINT) 200 (y COORDINATE OF END POINT) | 1 (LINE WIDTH) | |
| | re (RECTANGLE) | 10 | 210 | 100 | 1 |

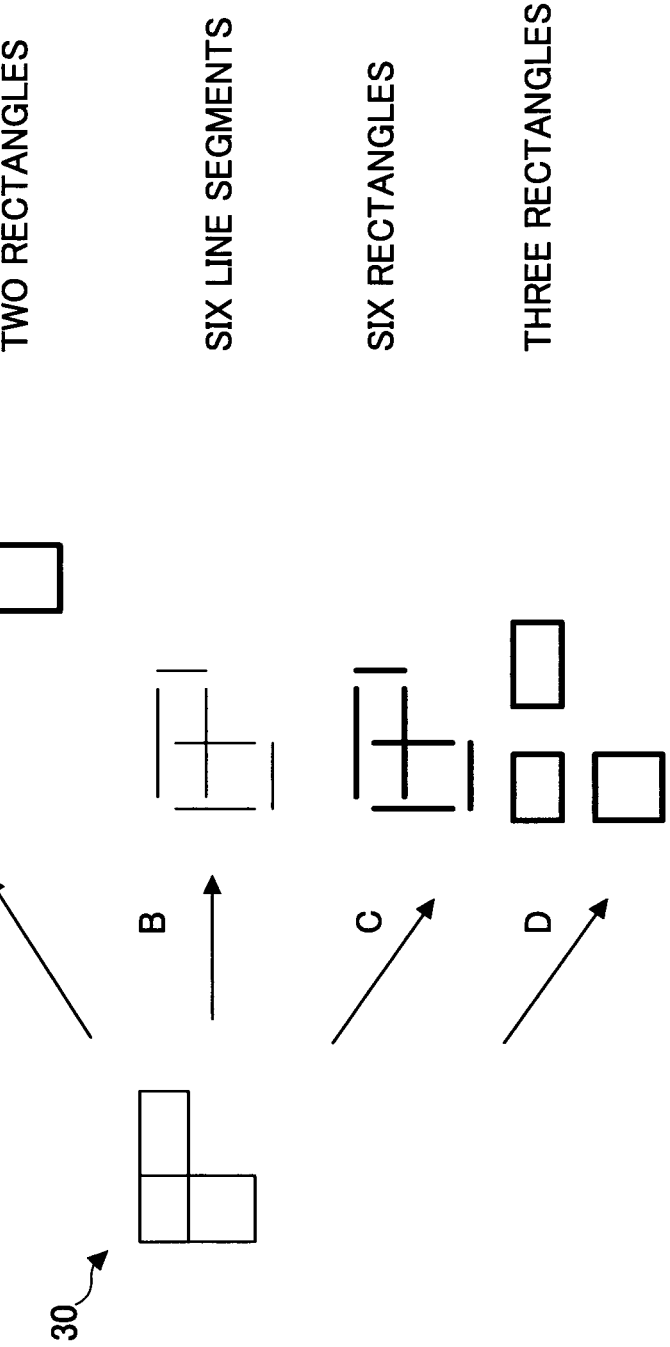

FIG.9
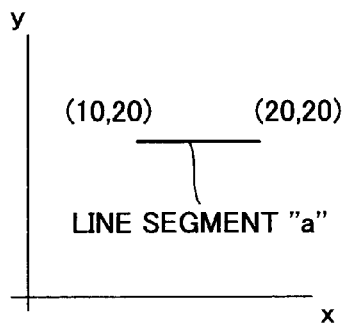
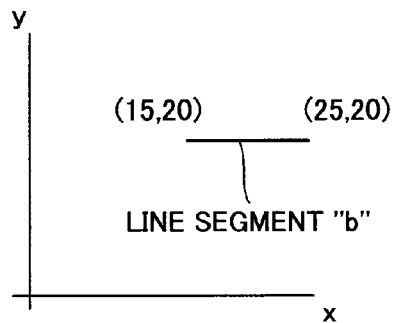
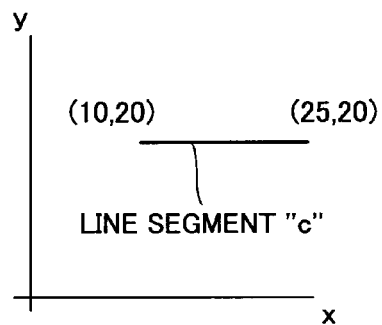
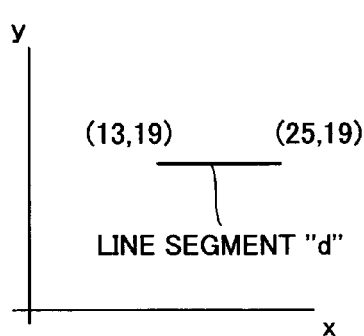
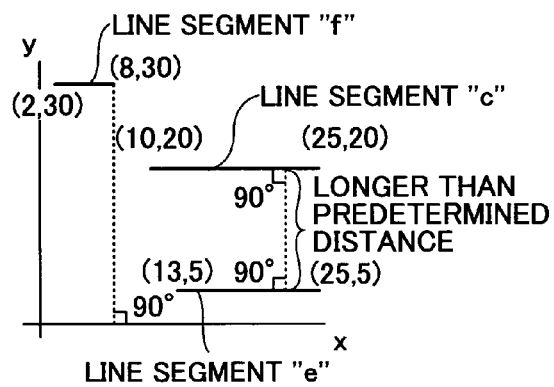

INFORMATION PROCESSING APPARATUS AND INFORMATION PROCESSING METHOD

TECHNICAL FIELD

The present invention generally relates to an information processing apparatus and an information processing method.

BACKGROUND ART

In a system for scanning a form on a paper and conducting an OCR (Optical Character Recognition) process with respect to each of items of the form, the system is required to accurately acquire location information of each field of the form beforehand. Therefore, in general, a user displays an image of the form on a screen of a display unit and indicates a location of each field, so as to register field location information of the form to the system beforehand.

However, such operations takes time. Japanese Patent No. 3586911 and Japanese Patent No. 3001950 disclose methods of searching for rectangle information by using an image process with respect to an image of a form. It is realized to automatically extract each rectangle (each field of the form) based on image data. On the other hand, there are problems in these inventions disclosed in the Japanese Patent No. 3586911 and the Japanese Patent No. 3001950. Since each rectangle is extracted based on the image data, for example, there are errors in that a letter is misread as a closing line and adversely a closing line is misread as a letter in the form. In a case of embedding data of a background image and a tint block on a background of the form, there are problems in that the background image and the tint block are misread as closing lines. Accordingly, these problems may degrade rectangle extraction accuracy. Moreover, in a case of drawing a closing line with a dotted line, it is difficult for an image process to recognize the dotted line as line segments of a single line. Thus, the image process may fail to extract a rectangle drawn by the dotted line. Furthermore, since the form is imaged by a pixel unit of the image, this imaging process is discrete. A difference may occur between a discrete space created by a certain discrete parameter and another discrete space. That is, a difference occurs between coordinates of a rectangle in a condition of imaging the form and another condition (in an image received from a scan, a fax, and a like with a different resolution), and it is difficult to always read the form accurately.

In general, the form is originally created by using an application software such as Microsoft® Word and Excel, Adobe® Acrobat, and a like. Information concerning locations of letters and closing lines is retained as vector information in an electronic file of the form. Closing line information and letter information is clearly distinct in the electronic file. It is possible to disperse the vector information by using discrete parameters without errors, and it is possible to read rectangles without errors even if an image is generated in any process circumstance.

Japanese Laid-open Patent Application No. 2005-190439 discloses to extract line segments from the vector information included in an electronic document and conduct an area indication. The vector information in the electronic document is decomposed into a vertical line segment and a horizontal line segment, and the area is indicated by using these line segments on a screen.

In the Japanese Laid-open Patent Application No. 2005-190439, areas are indicated or rectangles are extracted by extracting line segments. Only simple line segments and rectangles can be processed. Thus, it is impossible to accurately indicate the areas or extract the rectangles for a special case concerning the vector information. For example, in an actual electronic file, the special case is a case in which an object seen as a line segment on the screen is actually depicted as a rectangle drawing instruction in the vector information or vice versa an object seen as a rectangle on the screen is actually depicted as a line segment drawing instruction. Moreover, an error occurs to line segment information being extracted in the special case, and it may be determined that there is no connection. These problems may occur as a consequence of the vector information. In order to realize a higher accurate area extraction, it is necessary to solve the above-described problems.

DISCLOSURE OF THE INVENTION

In an aspect of this disclosure, there are provided an information processing apparatus and an information processing method, which extract highly accurate rectangle areas for a form by using the vector information included in an original electronic file and allows a user to appropriately indicate areas of rectangles for fields of the form.

In an exemplary embodiment of this disclosure, an information processing apparatus including an input unit for inputting an electronic file including vector information includes a reading part configured to read the vector information included in the electronic file, a first line segment extraction part configured to extract line segment parameter information of a line object from the vector information read by the reading part, a second line segment extraction part configured to extract polygon parameter information of a polygon object from the vector information read by the reading part and extract the line segment parameter information of line segments forming the polygon object from the extracted polygon parameter information, a rectangle extraction part configured to extract rectangle parameter information based on the line segment parameter extracted by the first line segment extraction part and the second line segment extraction part, a minimum rectangle determination part configured to determine whether or not a rectangle formed based on the rectangle parameter information extracted by the rectangle extraction part is a minimum rectangle which does not connote other rectangles, and a minimum rectangle output part configured to output the minimum rectangle determined by the minimum rectangle determination part.

The information processing apparatus may further includes a gradient acquisition part configured to acquire gradients of the line segments, which are extracted by the first line segment extraction part and the second line segment extraction part, with respect to a reference line, wherein the rectangle extraction part extracts rectangle parameter information of a rectangle formed by line segments perpendicular to each other, based on the line segment parameter information and the gradients corresponding to the line segments, in which the line segment parameter information is extracted by the first line segment extraction part and the second line segment extraction part, and the gradients are acquired by the gradient acquisition part.

The information processing apparatus may includes a gradient acquisition part configured to acquire gradients of line segments based on line segment parameter information extracted by the first line segment extraction part and the second line segment extraction part; and a third line segment extraction part configured to connect two line segments having the same gradient and being overlapped with each other and acquire the line segment parameter information of the two line segments being connected to each other, based on the line segment parameter information and the gradients corresponding to the line segments, in which the line segment parameter information is extracted by the first line segment extraction part and the second line segment extraction part, and the gradients are acquired by the gradient acquisition part, wherein the rectangle extraction part extracts the rectangle parameter information based on line segment parameter information in which the line segment parameter information of the two line segments being connected by the third line segment extraction part is excluded from and line segment parameter information of a single line segment formed by connecting the two line segments by the third line segment extraction part is added to the line segment parameter information extracted by the first line segment extraction part and the second line segment extraction part.

In the information processing apparatus, the third line segment extraction part may connect the two line segments when the gradients of the two line segments are the same and a distance between the two line segments is shorter than a predetermined length.

In another exemplary embodiment of the present invention, an information processing method in an information processing apparatus including an input unit for inputting an electronic file including vector information includes reading the vector information included in the electronic file; extracting line segment parameter information of a line object from the vector information read in reading the vector information; extracting polygon parameter information of a polygon object from the vector information read from the electronic file and extracting the line segment parameter information of line segments forming the polygon object from the extracted polygon parameter information; extracting rectangle parameter information based on the line segment parameter extracted in extracting the line segment parameter information and extracting the polygon parameter information; determining whether or not a rectangle formed based on the rectangle parameter information extracted in extracting the rectangle parameter information is a minimum rectangle which does not connote other rectangles; and outputting the minimum rectangle determined in determining the minimum rectangle.

In another exemplary embodiment of the present invention, there can be provided a method, an apparatus, a system, a computer program, a computer-readable recording medium, and a like in which elements, expressions, or combinations thereof is applied.

BRIEF DESCRIPTION OF THE DRAWINGS

Other objects, features, and advantages of the present invention will become more apparent from the following detailed description when read in conjunction with the accompanying drawings, in which:

FIG. 2 is a diagram illustrating vector information;

FIG. 3 is a diagram illustrating patterns to depict a graphic as the vector information;

FIG. 9 is a diagram for explaining a process to connect two line segments;

BEST MODE FOR CARRYING OUT THE INVENTION

In the following, an embodiment of the present invention will be described with reference to the accompanying drawings.

[Vector Information]

In the present invention, a highly accurate rectangular area is extracted or indicated from the vector information included in an electronic file.

In the vector information, a linear polygon like a ruled line and a geometric configuration such as a circle are depicted by a parameter string which includes a code specifying a type, coordinates of an apogee, a radius, and a like. Each of electronic files (electronic forms) created by a general editor such as Microsoft® Word and Excel, Adobe® Acrobat, and a like includes document information as the vector information. The vector information in the electronic files further includes graphic information concerning a closing line and a ruled line, and character information depicting a letter string in a document, and includes information concerning a background image and a tint block of the document.

Figure 1:
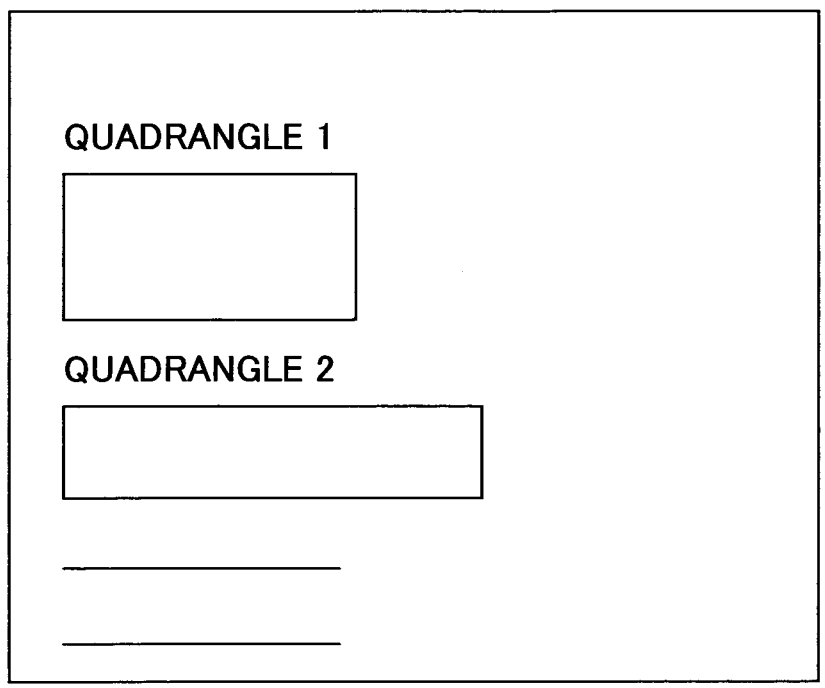
FIG. 1 is a diagram illustrating a form.

FIG. 1 is a diagram illustrating a form created by a PDF (Portable Document Format). The form illustrated in FIG. 1 corresponds to a case of displaying an electronic file of the format a PC terminal or a case of printing out to a sheet. It is noted that graphics and a like such as the line segment and the rectangle can be depicted by a vector format in the electronic file of the PDF format.

The vector information included in the electronic file of the PDF format will be illustrated in FIG. 2. FIG. 2 illustrates an example of depicting the graphics and the like by the vector information in the electronic file created in the PDF format. The vector information includes a text object (character information) which is denoted by a BT 201, graphic objects which are denoted by a rectangle 202 and a line segment 203, and parameters for the BT 201, the rectangle 202, and the line segment 203. In this example, the graphic objects are information of objects represented by path construction operators such as a "re (rectangle)" and a "l (line segment)" if the graphic objects are data of the PDF format. Line segments and rectangles illustrated in FIG. 1 are depicted based on the vector information included in the electronic file of the PDF format.

Next, problems specific to graphics to be depicted by vectors will be described. In FIG. 1, the form is visually formed by two rectangles and two line segments. On the other hand, in the vector information, various methods exist to depict these rectangles and line segments by vectors. The various methods will be described by using a polygon example in FIG. 3. FIG. 3 is a diagram illustration an example in which the same polygon 30 can be depicted by various depicting methods. The polygon 30 illustrated in FIG. 3 can be depicted by any one of four patterns A, B, C, and D of the depicting methods in the vector information. In the pattern A of the depicting methods, the polygon 30 is depicted by two rectangle sets (sides are partially overlapped). In the pattern B of the depicting methods, the polygon 30 is formed by line segments only. Also, in the pattern C of the depicting methods, portions seen as line segments are actually formed by small slender rectangles. When elements forming the polygon 30 are extracted, two rectangles are extracted in the pattern A, six line segments are extracted in the pattern B, and six rectangles are extracted in the pattern C. In the pattern D of the depicting methods, the polygon 30 is formed by three rectangles. Differences in the depicting methods are not visually distinguishable after each formation in the patterns A, B, C, and D is converted into an image. It is necessary to pay attention to this point when handling the polygon 30 as the vector information included in an electronic document. That is, even if the polygon 30 is visually the same, the polygon 30 can be formed by different elements in different vector information.

The present invention will be described with an example of a file of the PDF format in this embodiment. However, the present invention can be applied similarly to any electric file format in which the vector information can handled.

[Information Processing Apparatus]

Figure 4:
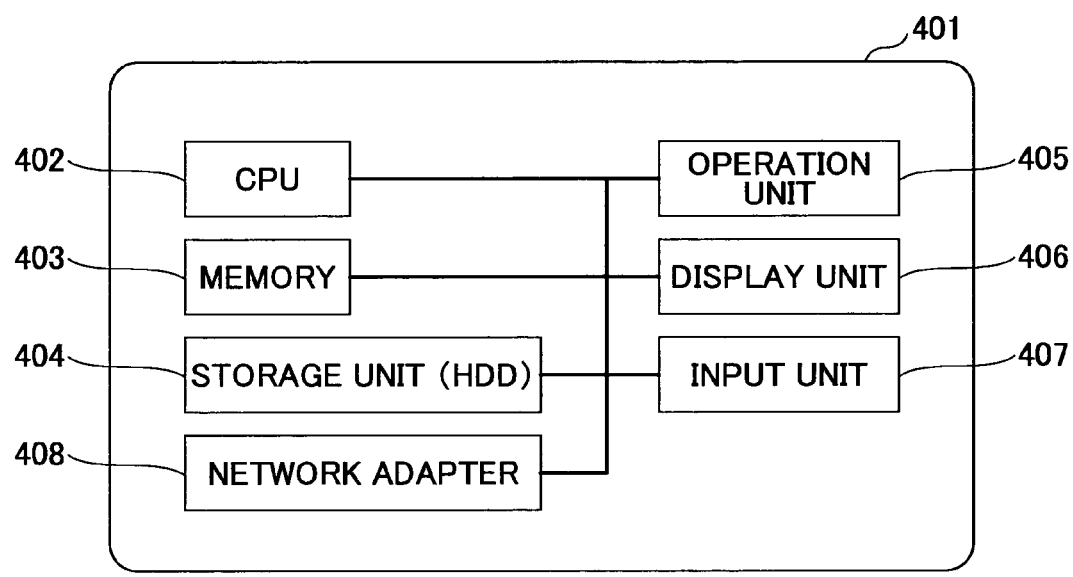
FIG. 4 is a diagram illustrating a configuration of an information processing apparatus.

Next, an information processing apparatus 401 according to the present invention will be described with reference to FIG. 4. The information processing apparatus 401 is a general computer such as a general PC (Personal Computer) or a like, and includes a CPU (Central Processing Unit) 402, a memory 403, a storage unit (HDD) 404, an operation unit 405, a display unit 406, an input unit 407, a network adapter 408, and a like. The information processing apparatus 401 can read an electronic file from an external recording medium or through a network. Moreover, a program realizing a process according to the present invention is stored in the storage unit 404, and executed by the CPU 402 after being stored in the memory 403.

[Description of Functions]

Figure 5:
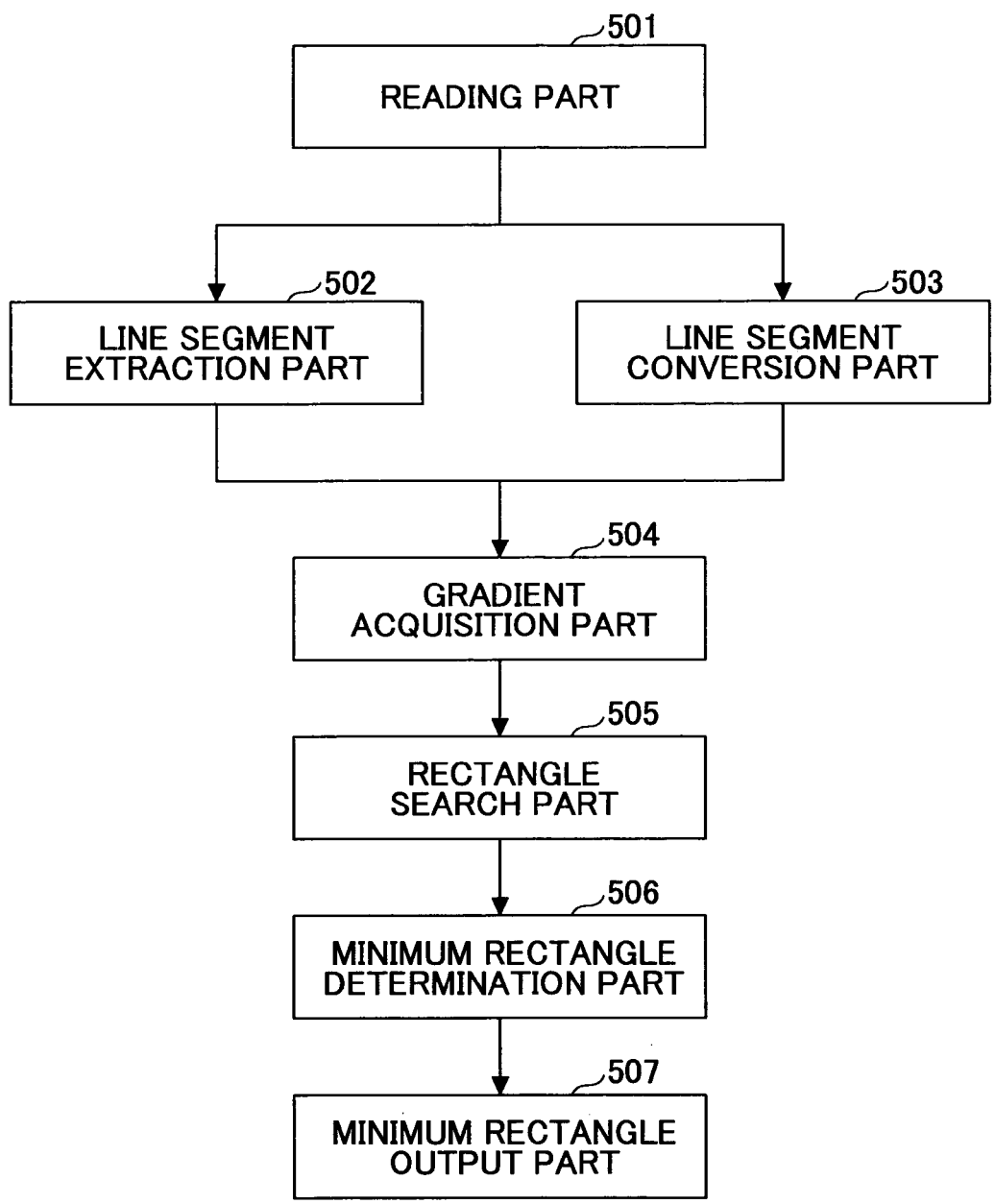
FIG. 5 is a block diagram illustrating a functional configuration of the information processing apparatus.

Next, functions according to the present invention implemented in the information processing apparatus 401 will be described with reference to FIG. 5. FIG. 5 is a block diagram illustrating functions implemented in the information processing apparatus 401. As the function according to the present invention, the information processing apparatus 401 includes a reading part 501, a line segment extraction part 502, a line segment conversion part 503, a gradient acquisition part 504, a rectangle search part 505, a minimum rectangle determination part 506, and a minimum rectangle output part 507. First, the information processing apparatus according to the present invention reads an electronic file (a PDF file or a like) to be a subject, and extracts vector information (for example, FIG. 2) being recorded in the electronic file. Subsequently, line segment information is extracted from the vector information read from the electronic file. The information processing apparatus 401 extracts the line segment information after converting a polygon into line segments. As described above, in order to avoid the problems specific to the vector information, the polygon is decomposed into line segments. Next, the information processing apparatus 401 extracts rectangles which can be formed by combining the extracted line segments. Then, the information processing apparatus 401 acquires and outputs a minimum rectangle from the extracted rectangles. These processes are conducted by process parts 501 through 507.

Subsequently, the reading part 501, the line segment extraction part 502, the line segment conversion part 503, the gradient acquisition part 504, the rectangle search part 505, the minimum rectangle determination part 506, and the minimum rectangle output part 507 will be described in detail.

[Reading Part]

First, the reading part 501 reads the electronic file (the PDF file and the like) to be a subject, which is input from the input unit 407, and extracts the vector information recorded in the electronic file. The vector information is described above with reference to FIG. 2.

[Line Segment Extraction Part]

Next, the line segment extraction part 502 extracts line segment parameter information concerning a line segment object from the vector information which is read by the reading part 501. Details will be described with reference to FIG. 2. The line segment 203 is information concerning one line segment in the vector information. A "OPERATOR" concerning an object is an "l (LINE SEGMENT)". The "l (LINE SEGMENT)" indicates that the object is a line segment. A "PARAMETER" includes information concerning the line segment. The line segment 203 includes information concerning x-coordinates and y-coordinates of start points and end points of the line segments in a coordinate space of the PDF file. From parameters, it is specified that one line segment is formed by a start point (10, 200) and a end point (110, 200). The line segment extraction part 502 extracts parameters (the line segment parameter information) of a "l (LINE SEGMENT)" object in the "OPERATOR".

[Line Segment Conversion Part]

The line segment conversion part 503 extracts parameters of a polygon object from the vector information which is extracted by the reading part 501, and extracts parameter information of line segments forming a polygon as the line segment parameter information. In the polygon object read by the reading part 501, various graphics of polygons (including rectangles) and curved lines are mixed. Thus, the various graphics are decomposed into line segments which are minimum units, and the line segment parameter information is extracted from each of line segments. In order to overcome the above-described problems specific to the vector information, first, the polygon is decomposed into the line segments.

This decomposition process will be explained in detail by referring to the polygon 30 illustrated in FIG. 3. The polygon exemplified in FIG. 3 visually seems to be formed by three rectangles as shown by the pattern D. In considering how the polygon 30 is depicted by using the vector information, it is assumed that the polygon 30 is formed by six line segments as shown by the pattern B. Even if the polygon 30 is visually formed as shown by the pattern D, as a matter of fact, the vector information does not depict the polygon 30 as the pattern D. That is, in a case of attempting to extract rectangles based on the vector information in this example, it is determined that there is no rectangle in the vector information and no rectangle can be extracted. Accordingly, in order to extract rectangles by using the vector information, it is required to decompose into line segments and re-forming with the line segments.

Figure 6:
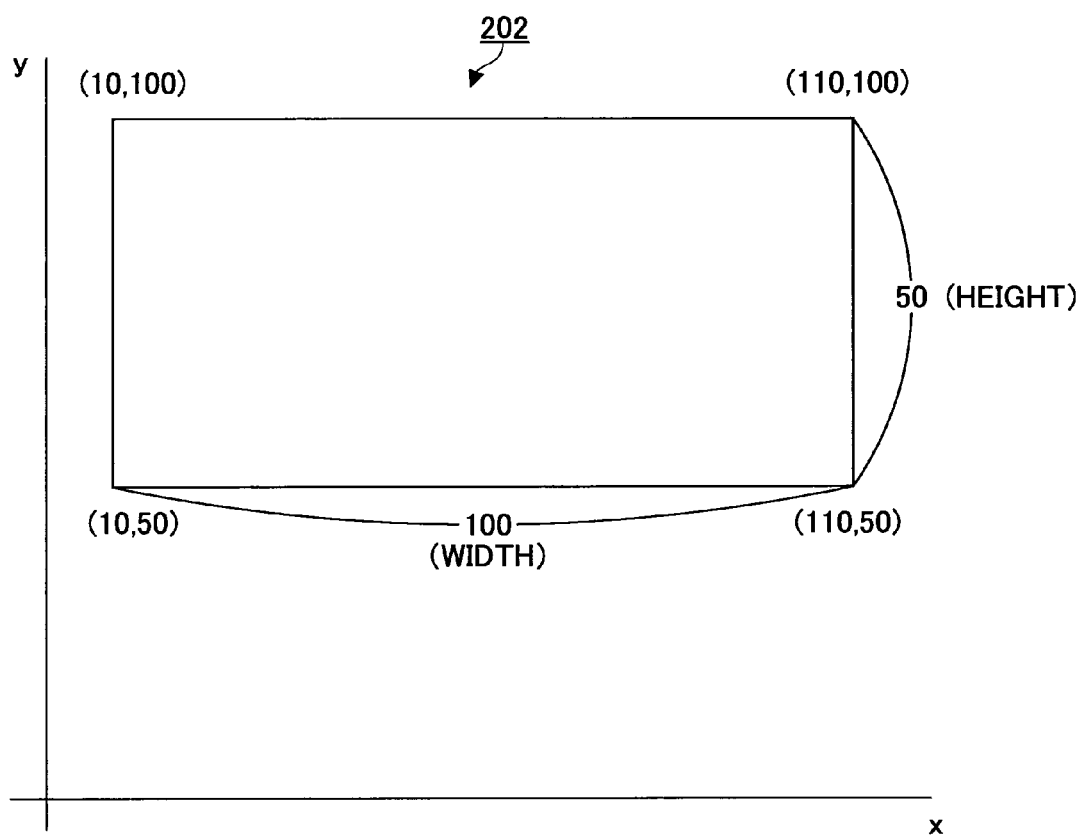
FIG. 6 is a diagram illustrating a rectangle depicted based on parameters in the vector information.

Next, the decomposition process will be explained. In FIG. 2, the rectangle 202 is specified by a rectangle object "re". Parameters of the rectangle 202 indicates a value "10" (x-coordinate), a value "50" (y-coordinate), a value "100" (width), and a value "50" (height). In FIG. 6, the rectangle 202 is depicted in a coordinate system by using the parameters. Four line segments are extracted from four sides (a top side, a bottom side, a left side, and a right side) forming the rectangle 202. As an extraction result, line segment parameter information is acquired for each of four line segments. For the bottom side of the rectangle 202, an operator "l" is defined with the line parameter information which indicates the x-coordinate of the start point is "10", the y-coordinate of the start point is "50", the x-coordinate of the end point is "110", and the y-coordinate of the end point is "50". As described above, the line segment conversion part 503 converts the polygon 30 into the line segments.

[Gradient Acquisition Part]

Figure 7:
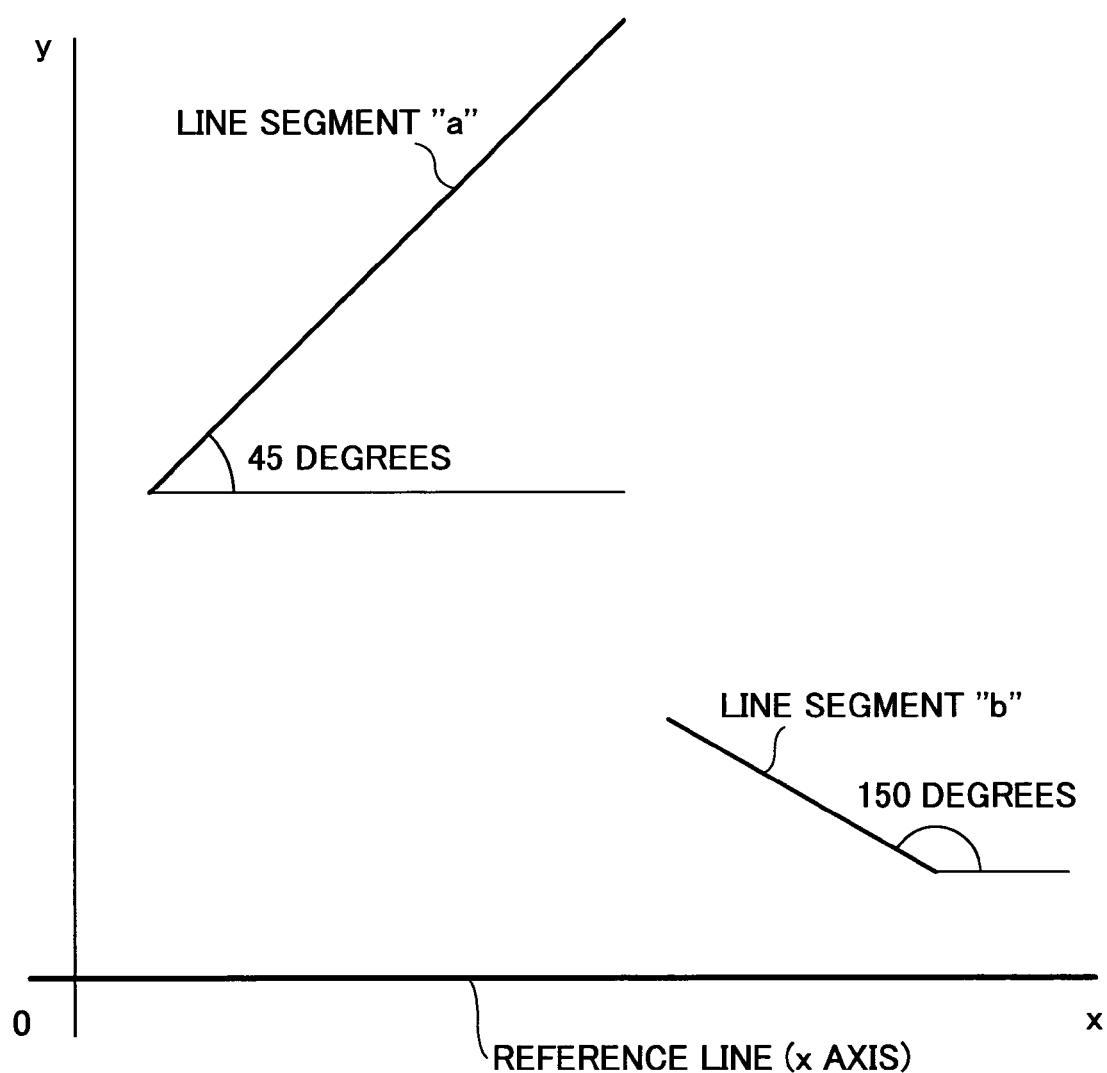
FIG. 7 is a diagram illustrating a gradient acquisition.

The gradient acquisition part 504 acquires a gradient of each of line segments based on the line segment parameter information extracted by the line segment extraction part 502 and the line segment conversion part 503, with respect to a reference line. The reference line is the x-coordinate or the like to be a reference in the coordinate system within a PDF file. The gradient acquisition part 504 acquires the gradient of the line segment with respect to the reference line. The reference line is not limited to the x-coordinate and can be any line which can be used as a reference to determine the gradient of the line segment. Based on the line segment parameter information of each of the line segments, the gradient acquisition part 504 acquires the gradient corresponding to each of the line segments. FIG. 7 is a diagram illustrating examples of acquiring gradients of a line segment "a" and a line segment "b" by using the x-coordinate as the reference line. The line segment "a" is at 45 degrees with respect to the x-coordinate, and the line segment "b" is at 150 degrees with respect to the x-coordinate. Thus, the gradient acquisition part 504 acquires a gradient of 45 degrees and a gradient of 150 degree for the line segments "a" and "b", respectively. A purpose of acquiring these gradients will be described later.

[Rectangle Search Part]

Figure 8:
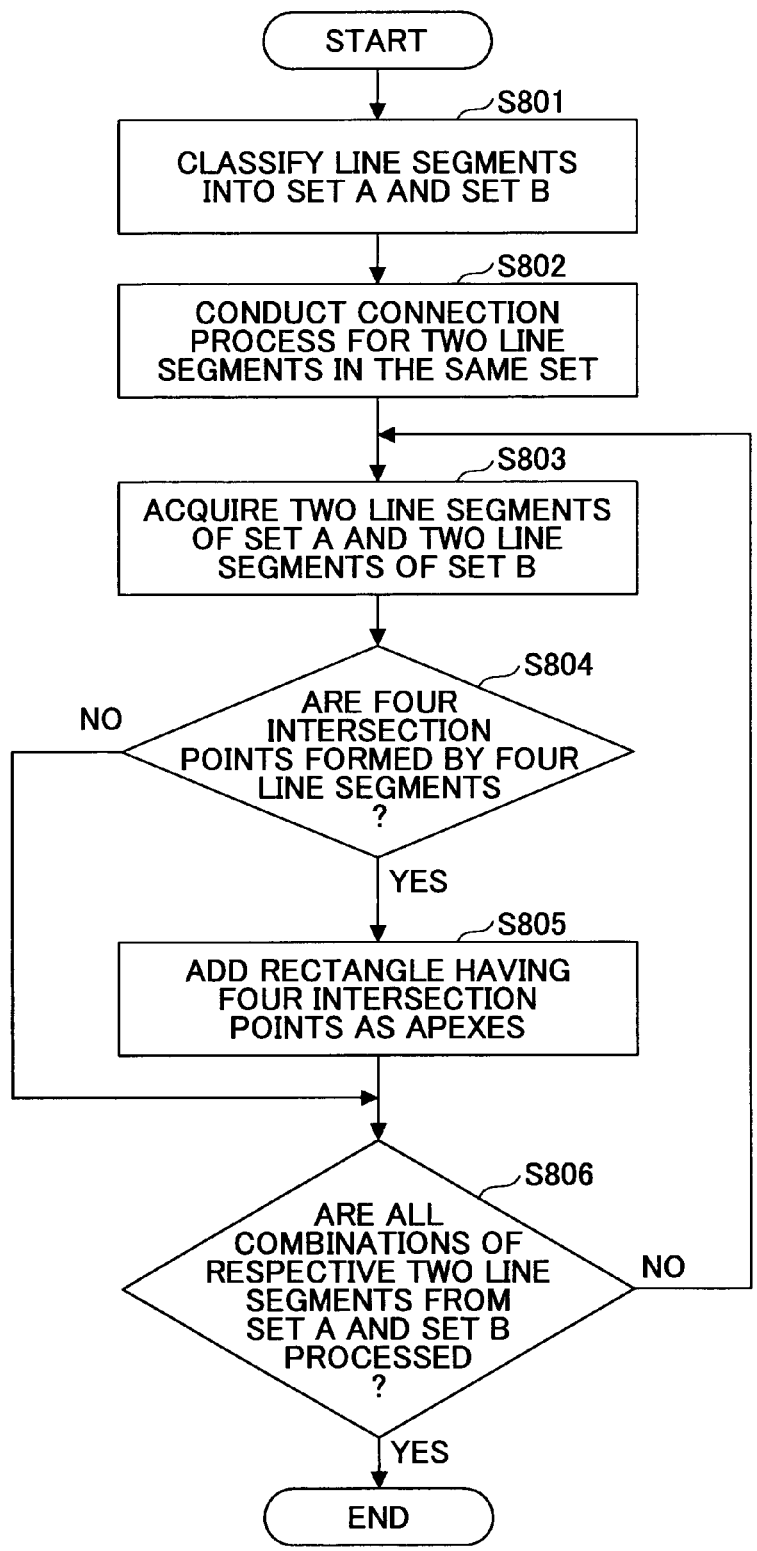
FIG. 8 is a flowchart for explaining a process conducted by a rectangle search part.

Next, the rectangle search part will be explained. The rectangle search part 505 searches for a rectangle based on the line segment parameter information extracted by the line segment extraction part 502 and the line segment conversion part 503. By combining line segments, a rectangle search process is conducted to form a rectangle. The rectangle search process will be described with reference to a flowchart in FIG. 8.

Figure 10:
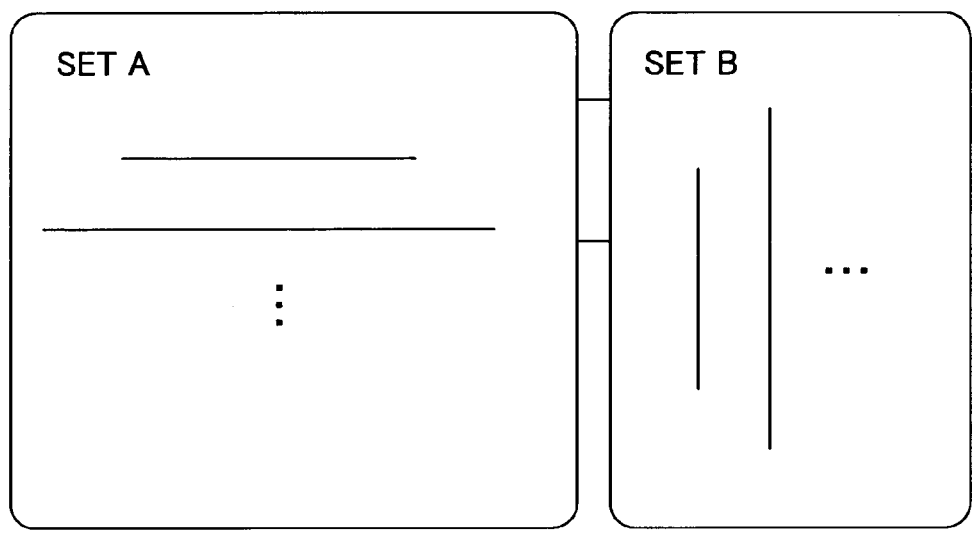
FIG. 10 is a diagram illustrating sets classifying line segments.

First, in a step S801, prior to searching for a rectangle, the line segments are classified into a set A of line segments parallel to the x-coordinate, and a set B of line segments parallel to the y-coordinate. FIG. 10 illustrates the set A of line segments parallel to the x-coordinate, and a set B of line segments parallel to the y-coordinate. The set A and the set B are not limited to sets of line segments parallel to the X-coordinate and the y-coordinate and can be one set of line segments which have a certain inclination and another set of line segments which are orthogonal to the line segments classified in the one set. In this embodiment, since graphics depicted on a general form are quadrangles (rectangles) formed by combining lines parallel to the x-coordinate and lines parallel to the y-coordinates, the set A is defined for line segments parallel to the x-coordinate and the set B is defined for line segments parallel to the y-coordinate, so as to effectively extract the quadrangles (rectangles). Also, a rectangle is formed by four line segments being perpendicular to each other at apexes. Thus, a rectangle extraction process is conducted so that a rectangle is extracted from line segments being orthogonal to each other, and the rectangle search process is effectively conducted by eliminating combinations of unnecessary line segments.

Moreover, in a step S802, any two line segments (parallel to each other) are extracted from one set (the set A or the set B). If these two line segments are overlapped, a new line segment is created by connecting these two line segments, and is replaced with theses two line segments. It is possible to reduce a number of line segments and to effectively conduct the rectangle search process. FIG. 9 is a diagram illustrating a connection example of line segments. A line segment "a" is a line segment having the start point (10, 20) and the end point (20, 20). Also, a line segment "b" is a line segment having the start point (15, 20) and the end point (25, 20). Both two line segments "a" and "b" are parallel to the x-coordinate and classified into the set B, and have an overlapped portion in a xy coordinate system. Thus, these line segments "a" and "b" can be connected to form a single line segment. A line segment "c" is formed by connecting the line segment "a" and the line segment "b". The line segment "c" is added to the set B and the line segments "a" and "b" are deleted.

In addition, a line segment "d" will be explained. The line segment "d" is parallel to the line segment "a" but does not have a portion overlapped with the line segment "a". However, a distance is "1" between these two line segments "a" and "d" (the distance is calculated from the y-coordinate). Even if there is no portion overlapped with each other based on the vector information, these line segments "a" and "d" are visually overlapped with each other on a display screen or on a printed sheet. If the distance is "0.5" or "0.01" (in millimeter for example) much smaller between two line segments "a" and "d", the line segments "a" and "d" are significantly seen as one line segment. That is, even in a case in that a line segment does not have an overlapped portion based on the vector information, if a distance between two line segments is shorter than a predetermined length, these two line segments are visually seen as one line segment (two line segments are overlapped with each other). Accordingly, there two line segments are also subjects to be connected to form a single line segment. Thus, the line segment "a" and the line segment "d" are connected to form the line segment "c". The distance in this case is the shortest distance measured by drawing a line perpendicular to two line segments as illustrated by the line segment "c" and a line segment "e". A line segment "f" is not a subject to be connected since there is no distance measured by a line perpendicular from the line segment "f" to the line segment "c". As described above, in addition to reducing the number of line segments to be processed, it is possible to flexibly search for rectangles corresponding to item fields on a form by connecting line segments which do not have the overlapped portion based on the vector information but which substantially (visually) have the overlapped portion.

Next, the rectangle search process begins. In a step S803, two line segments are retrieved from each of the set A of line segments parallel to the x-coordinate and the set B of line segments parallel to the y-coordinate, and all combinations of four line segments are checked. If four intersection points are formed from the four line segments in a step S804, a rectangle having the four intersections points is obtained (as rectangle parameter information) and is added to a rectangle set R in a step S805. The rectangle set R is a set to store rectangles which are extracted by the rectangle search part 505.

Figure 11:
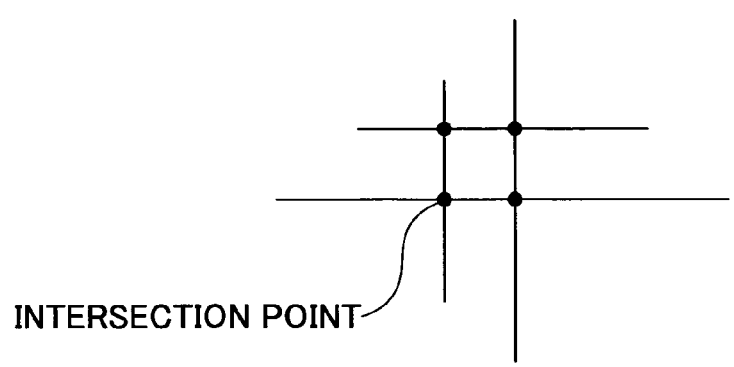
FIG. 11 is a diagram illustrating line segments having intersection points.

FIG. 10 illustrates an example of classifying line segments into the set A of line segments parallel to the x-coordinate and the set B of line segments parallel to the y-coordinate. Two line segments are retrieved from each of the set A and the set B. As depicted in FIG. 11, if four intersection points are formed in the coordinate system, a rectangle having these four intersection points is obtained (as the rectangle parameter information). In a step S806, when all combination of four line segments are processed, the rectangle search process is terminated.

In order to effectively conduct the rectangle search process, only line segments parallel to either the x-coordinate and the y-coordinate are extracted and classified into respective one of the set A and the set B. However, it is not limited to extracting rectangles having line segments parallel to the x-coordinate and the y-coordinate. Since graphics in a general form are quadrangles (rectangles), only rectangles having sides parallel to the x-coordinate and the y-coordinate are searched for. Alternatively, line segments may be classified in to sets X for angles, and line segments retrieved from the sets X are combined. In this case, the rectangle search process is not limited to an angle of a quadrangle. That is, it is possible to extract a graphic of not only a rectangle but also a rhombus and a like (quadrangles having all four angles other than 90 degrees). Moreover, instead of acquiring a gradient, all types of quadrangles possible to be formed by combining line segments may be subject to be processed. Furthermore, depending on an application circumstance or a like, a combination of n line segments is checked as appropriate, and n-polygons each having n sides are extracted.

[Minimum Rectangle Determination Part]

Next, the minimum rectangle determination part 506 will be explained. A determination of a minimum rectangle is performed rectangles stored in the rectangle set R subject to be processed. It is determined whether a rectangle formed based on the rectangle parameter information acquired by the rectangle search part 505 is a minimum rectangle, by checking if the rectangle can connote other rectangles. The minimum rectangle is a rectangle which can not connote other rectangles within an area of the rectangle. If the rectangle does not connote other rectangles, information indicating the minimum rectangle is additionally provided for the rectangle. On the other hand, information indicating that the rectangle is not the minimum rectangle is additionally provided for the rectangle.

Figure 12:
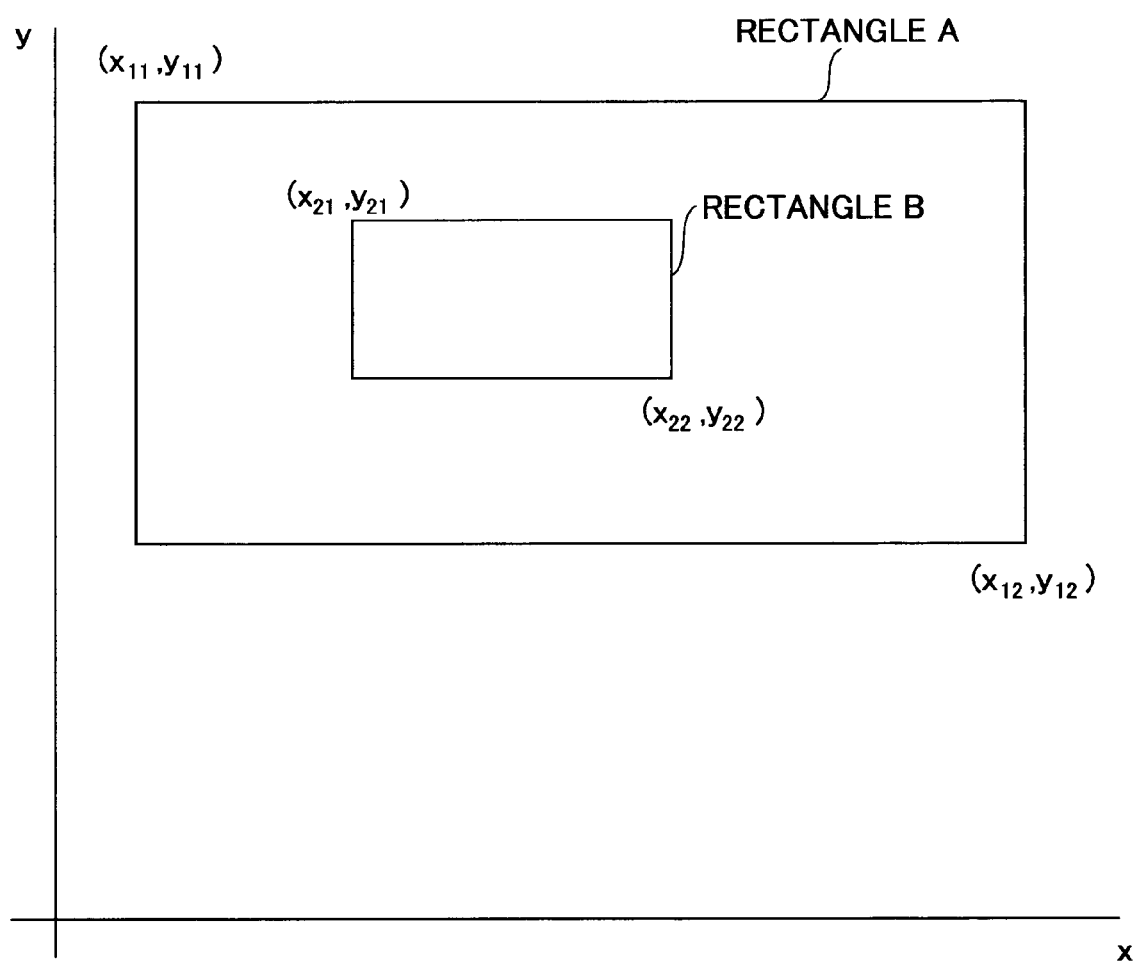
FIG. 12 is a diagram illustrating one rectangle connoting another rectangle.

The check of connoting other rectangles is performed as follows. FIG. 12 illustrates a case in that a rectangle A connotes a rectangle B. Coordinates of two apexes of the rectangle A represented by $(x_{11}, y_{11})$ and $(x_{12}, y_{12})$ are respectively compared with coordinates of two apexes of the rectangle B represented by $(x_{21}, y_{21})$ and $(x_{22}, y_{22})$ If $x_{11} < x_{21}$, $y_{11} < y_{21}$, $x_{12} > x_{22}$, and $y_{12} > y_{22}$, the rectangle A connotes the rectangle B. Since the rectangle A connotes the rectangle B, the rectangle A is not the minimum rectangle. Since there is no rectangle which is connoted within the rectangle B, the rectangle B is the minimum rectangle.

Figure 13:
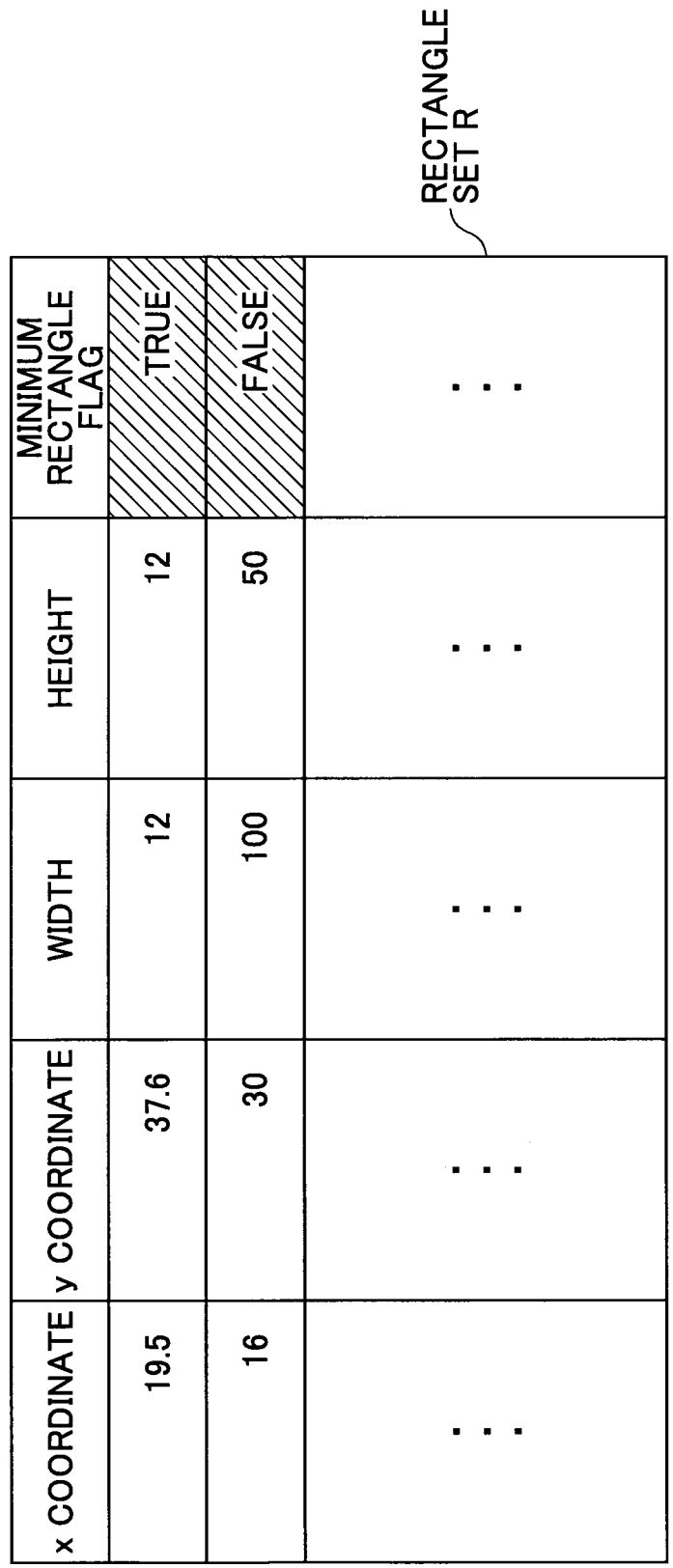
FIG. 13 is a diagram illustrating a result from determining a minimum rectangle.

The rectangle set R illustrated as a table in FIG. 13 includes items of "x COORDINATE", "y COORDINATE", "WIDTH", "HEIGHT", and "MINIMUM RECTANGLE FLAG", and stores the rectangle parameter information of each rectangle formed by the combination of the line segments retrieved from the sets A and B.

For a rectangle which is determined as the minimum rectangle, for example, a flag indicating "true" is set to the minimum rectangle flag as shown in FIG. 13.

On the other hand, a flag indicating "false" is set to the minimum rectangle flag for a rectangle which is not the minimum rectangle, as shown in FIG. 13.

[Minimum Rectangle Output Part]

Figure 14:
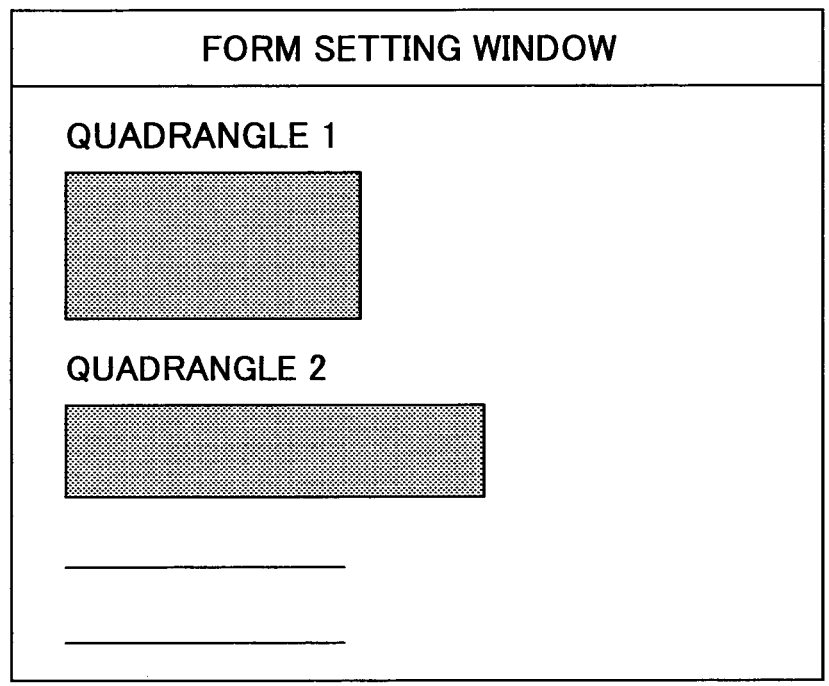
FIG. 14 is a diagram illustrating a form setting window.

The minimum rectangle output part 507 outputs and displays rectangles determined as the minimum rectangles by the minimum rectangle determination part 506 at the display unit 406. FIG. 14 illustrates a display example of a "form setting window". Rectangles concerning a "QUADRANGLE 1" and a "QUADRANGLE 2" are displayed since the rectangles are determined as the minimum rectangles. Other rectangles are not displayed since those are not determined as the minimum rectangles.

The minimum rectangle output part 507 superimposes minimum rectangle information on an image of a form and displays at a screen for a user to set field location information from the form. The rectangle parameter information of the minimum rectangle flag indicating the "true" is extracted as the minimum rectangle information from the rectangle set R. Thus, the user can easily create settings of the form by using the minimum rectangle information.

The rectangle parameter information of the rectangle determined as the minimum rectangle in FIG. 13 may be added to the vector information of the electronic file of the PDF format. In the vector information in FIG. 2, "re" is added as the "OPERATOR" and the rectangle parameter information of the minimum rectangle is added as the "PARAMETER". Since the minimum rectangle is specified by this addition to the vector information, it is not required to conduct the above-described process again.

[Processes for Exceptional Line Segments and Rectangles]

First, a process for exceptional line segments will be explained. The line segment parameter information in the vector information includes a parameter indicating a "LINE WIDTH". For example, if a value of the "LINE WIDTH" is a considerably great value such as "20", it is appropriate to consider that the line segment is rather a rectangle visually. Accordingly, if the "line width" of a line segment is wider than a predetermined value, this object is processed as a rectangle rather than the line segment. This process may be conducted in the line segment extraction part 502, or may be conducted prior to the rectangle search process in the rectangle search part 505. The predetermined value for the "LINE WIDTH" may be a value of an initial line width defined in the electronic file, or may be set by the user.

Next, a process for the exceptional rectangles will be explained. For example, if a value of the "HEIGHT" is a considerably small value such as "1" or "0.5" (in millimeter for example) in a parameter indicating a "HEIGHT" in the rectangle parameter information, it is appropriate to consider that the rectangle is rather a line segment visually. Accordingly, if the "HEIGHT" of the rectangle is shorter than a predetermined value, this object is processed as a line segment rather than the rectangle. This process may be conducted in the line segment conversion part 503 or may be conducted prior to the rectangle search process in the rectangle search part 505. The predetermined value for the "HEIGHT" may be a value of an initial height defined in the electronic file, or may be set by the user.

[Process of Graphic Characters]

A process of a graphic character will be explained. The graphic character is a character representing a graphic such as "□", "◇", "○", or a like, which is generally used as a checkbox in the form. Since the graphic character is a type of characters, the graphic character is depicted as a text object in the vector information. Accordingly, when the graphic characters are processed, the vector information in which "BT" (text object) is set as the "OPERATOR" and the graphic character is included in the "PARAMETERS". The graphic character acquired from the vector information is processed as the minimum rectangle. For example, since the graphic character "□" does not connote other rectangles, the graphic character "□" can be determined as the minimum rectangle. A graphic character extraction part may be provided and conduct this process. It is possible for the user to indicate an area showing the graphic character as the rectangle.

[Details of Processes]

Figure 15:
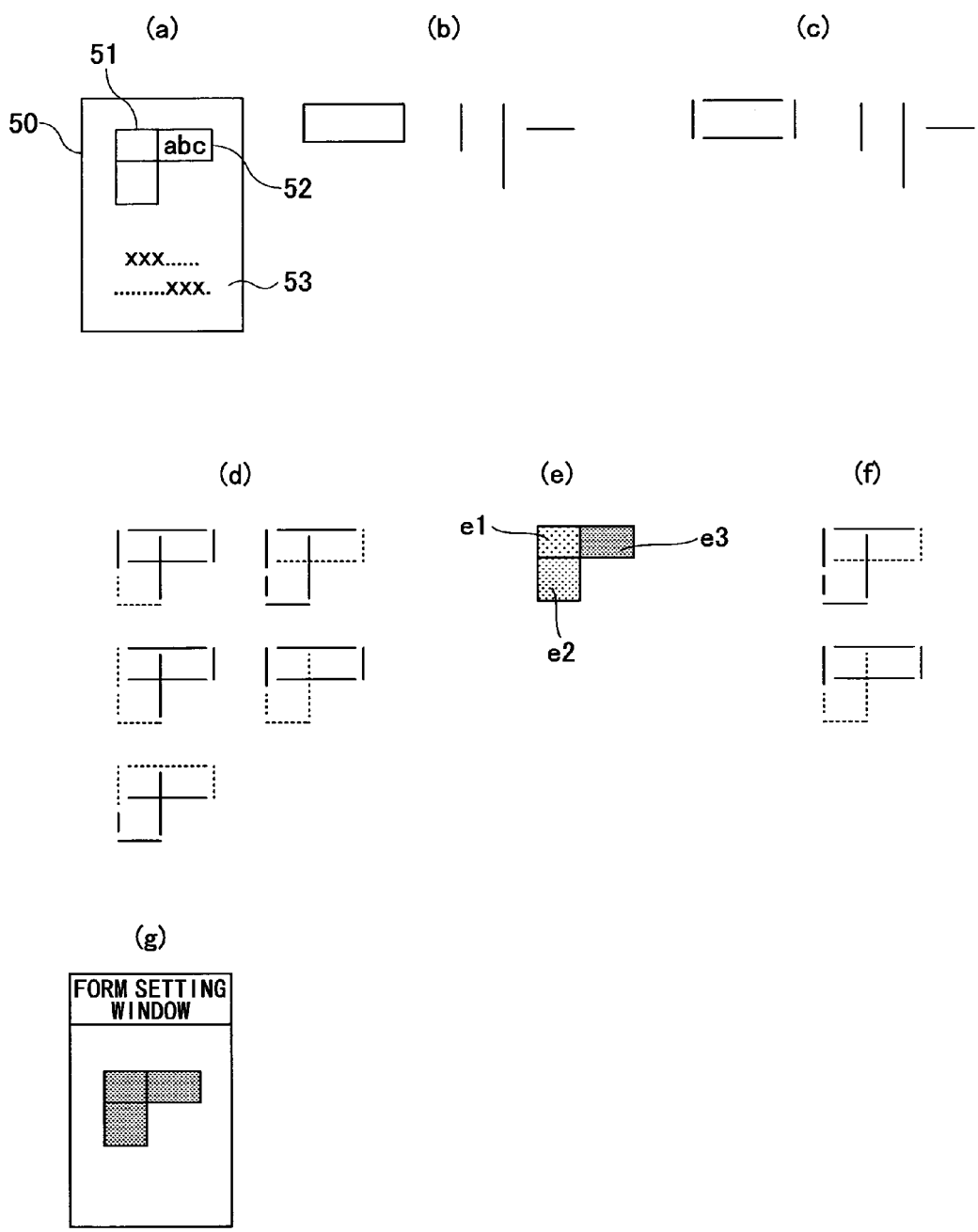
FIG. 15 is a diagram illustrating processes concerning the line segments and rectangles in a form.

In this embodiment, details of the above-described processes will be described with reference to FIG. 15. A form 50 of the electronic file is depicted in FIG. 15(*a*). Graphic 51, characters 52 (which do not include the graphic character), and a string 53 are depicted in the form 50. The graphic 51 is composed by one rectangle and three line segments as illustrated in FIG. 15(b).

First, the line segment information is extracted by the line segment extraction part 502 for each of three ling segments. The graphic 51 is converted into four line segments by the line segment conversion part 503. As a result, seven line segments are acquired as illustrated in FIG. 15(c).

Next, gradients of the seven line segments are acquired by the gradient acquisition part 504. Based on the acquired gradients, the seven line segments are classified into three line segments parallel to the x-coordinate (the set A) and four line segments parallel to the y-coordinate (the set B). Since there are no line segments which are parallel and overlap each other, none of the seven line segments are connected.

The rectangle search part 505 combines four line segments in which two line segments are retrieved from the set A and other two line segments are retrieved from the set B. As a search result, five rectangles are formed as illustrated in FIG. 15(d). In practice, a rectangle has four intersection points. For a sake of depicting separate line segments, the intersection points are not shown in FIG. 15(d).

Next, the minimum rectangle determination part 506 determines whether or not each of the five rectangles formed as illustrated in FIG. 15(d) includes other rectangles. As a determined result, rectangles e1, e2, and e3, which do not include other rectangles, are determined as the minimum rectangles as illustrated in FIG. 15(e). Other rectangles illustrated in FIG. 15(f) are not determined as the minimum rectangles.

The minimum rectangle output part 507 outputs and displays three rectangles, which are determined as the minimum rectangles, on a "form setting window" depicted in FIG. 15(g). Accordingly, the user indicates areas on a form imaged on the "form setting window"

According to the present invention, it is possible to extract highly accurate rectangle areas for a form by using the vector information included in an original electronic file, and it is possible for the user to appropriately indicate areas of rectangles for fields of the form.

The present invention is not limited to the specifically disclosed embodiments, and variations and modifications may be made without departing from the scope of the invention.

The present application is based on the Japanese Priority Patent Application No. 2007-292311 filed on Nov. 9, 2007, the entire contents of which are hereby incorporated by reference.

The invention claimed is:

1. An information processing apparatus including an input unit for inputting an electronic file including vector information which includes at least graphic information and character information, comprising:
a reading part configured to read the vector information included in the electronic file;
a first line segment extraction part configured to extract line segment parameter information of a line object from the graphic information different from the character information in the vector information read by the reading part;
a second line segment extraction part configured to extract polygon parameter information of a polygon object from the graphic information different from the character information in the vector information read by the reading part and extract the line segment parameter information of line segments forming the polygon object from the extracted polygon parameter information;
a rectangle extraction part configured to extract rectangle parameter information based on the line segment parameter extracted by the first line segment extraction part and the second line segment extraction part;
a minimum rectangle determination part configured to determine whether or not a rectangle formed based on the rectangle parameter information extracted by the rectangle extraction part is a minimum rectangle which does not connote other rectangles; and
a minimum rectangle output part configured to output the minimum rectangle determined by the minimum rectangle determination part.

2. The information processing apparatus as claimed in claim 1, further comprising a gradient acquisition part configured to acquire gradients of the line segments, which are extracted by the first line segment extraction part and the second line segment extraction part, with respect to a reference line,
wherein the rectangle extraction part extracts rectangle parameter information of a rectangle formed by line segments perpendicular to each other, based on the line segment parameter information and the gradients corresponding to the line segments, in which the line segment parameter information is extracted by the first line segment extraction part and the second line segment extraction part, and the gradients are acquired by the gradient acquisition part.

3. The information processing apparatus as claimed in claim 1, further comprising:
a gradient acquisition part configured to acquire gradients of line segments based on line segment parameter information extracted by the first line segment extraction part and the second line segment extraction part; and
a third line segment extraction part configured to connect two line segments having the same gradient and being overlapped with each other and acquire the line segment parameter information of the two line segments being connected to each other, based on the line segment parameter information and the gradients corresponding to the line segments, in which the line segment parameter information is extracted by the first line segment extraction part and the second line segment extraction part, and the gradients are acquired by the gradient acquisition part,
wherein the rectangle extraction part extracts the rectangle parameter information based on line segment parameter information in which the line segment parameter information of the two line segments being connected by the third line segment extraction part is excluded from and line segment parameter information of a single line segment formed by connecting the two line segments by the third line segment extraction part is added to the line segment parameter information extracted by the first line segment extraction part and the second line segment extraction part.

4. The information processing apparatus as claimed in claim 3, wherein the third line segment extraction part connects the two line segments when the gradients of the two line segments are the same and a distance between the two line segments is shorter than a predetermined length.

5. The information processing apparatus as claimed in claim 1, further comprising a graphic character extraction part configured to extract graphic character information of a text object from the vector information read by the reading part, wherein a graphic character formed based on the graphic character information extracted by the graphic character extraction part.

6. The information processing apparatus as claimed in claim 5, wherein the graphic character is "☐", "◇", or "○".

7. The information processing apparatus as claimed in claim 1, further comprising an addition part configured to add minimum rectangle parameter information of the minimum rectangle determined by the minimum rectangle determination part.

8. An information processing method in an information processing apparatus including an input unit for inputting an electronic file including vector information which includes at least graphic information and character information, the information processing method comprising:
  reading the vector information included in the electronic file;
  extracting line segment parameter information of a line object from the graphic information different from the character information in the vector information read in reading the vector information;
  extracting polygon parameter information of a polygon object from the graphic information different from the character information in the vector information read from the electronic file and extracting the line segment parameter information of line segments forming the polygon object from the extracted polygon parameter information;
  extracting rectangle parameter information based on the line segment parameter extracted in extracting the line segment parameter information and extracting the polygon parameter information;
  determining whether or not a rectangle formed based on the rectangle parameter information extracted in extracting the rectangle parameter information is a minimum rectangle which does not connote other rectangles; and
  outputting the minimum rectangle determined in determining the minimum rectangle.

9. The information processing method as claimed in claim 8, further comprising:
  acquiring gradients of the line segments, which are extracted in extracting line segment parameter information and in extracting polygon parameter information, with respect to a reference line,
  wherein in extracting the rectangle parameter information, rectangle parameter information of a rectangle formed by line segments perpendicular to each other is extracted, based on the line segment parameter information and the gradients corresponding to the line segments, in which the line segment parameter information is extracted in extracting line segment parameter information and in extracting polygon parameter information, and the gradients are acquired in acquiring gradients.

10. The information processing method as claimed in claim 8, further comprising:
  acquiring gradients of line segments based on line segment parameter information extracted in extracting line segment parameter information and in extracting polygon parameter information; and
  connecting two line segments having the same gradient and being overlapped with each other and acquiring the line segment parameter information of the two line segments being connected to each other, based on the line segment parameter information and the gradients corresponding to the line segments, in which the line segment parameter information is extracted in extracting line segment parameter information and in extracting polygon parameter information, and the gradients are acquired in acquiring the gradients,
  wherein in extracting rectangle parameter information, the rectangle parameter information is extracted based on line segment parameter information in which the line segment parameter information of the two line segments being connected in connecting the two line segments is excluded from and line segment parameter information of a single line segment formed by connecting the two line segments in connecting the two line segments is added to the line segment parameter information extracted in extracting line segment parameter information and in extracting polygon parameter information.

11. The information processing method as claimed in claim 10, wherein in connecting the two line segments, the two line segments are connected to each other when the gradients of the two line segments are the same and a distance between the two line segments is shorter than a predetermined length.

12. The information processing method as claimed in claim 8, further comprising:
  extracting graphic character information of a text object from the vector information read in reading the vector information,
  wherein a graphic character formed based on the graphic character information extracted in extracting the graphic character information.

13. The information processing method as claimed in claim 12, wherein the graphic character is "☐", "◇", or "○".

14. The information processing method as claimed in claim 8, further comprising
  adding minimum rectangle parameter information of the minimum rectangle determined in determining the minimum rectangle.

15. A non-transitory computer readable storage medium recorded with a rectangle extraction program, said rectangle extraction program comprising codes for:
  reading vector information which includes at least graphic information and character information included in an electronic file;
  extracting line segment parameter information of a line object from the graphic information different from the character information in the vector information read in reading the vector information;
  extracting polygon parameter information of a polygon object from the graphic information different from the character information in the vector information read from the electronic file and extracting the line segment parameter information of line segments forming the polygon object from the extracted polygon parameter information;
  extracting rectangle parameter information based on the line segment parameter extracted in extracting the line segment parameter information and extracting the polygon parameter information;
determining whether or not a rectangle formed based on the rectangle parameter information extracted in extracting the rectangle parameter information is a minimum rectangle which does not connote other rectangles; and
  outputting the minimum rectangle determined in determining the minimum rectangle.

16. The information processing apparatus as claimed in claim 1, wherein the rectangle extraction part extracts the rectangle parameter information from the line segment parameter information extracted by the first line segment extraction part and the second line segment extraction part by classifying line segments into one of at least a first set of line segments which are parallel to one anther and a second set of line segments which are parallel to one another.

17. The information processing apparatus as claimed in claim 2, wherein a gradient of a line segment is defined by an angle of the line segment with respect to the reference line.

18. The information processing apparatus as claimed in claim 3, wherein a gradient of a line segment is defined by an angle of the line segment with respect to a reference line.

19. The information processing apparatus as claimed in claim 17, wherein the rectangle extraction part extracts the rectangle parameter information from the line segment parameter information extracted by the first line segment extraction part and the second line segment extraction part by classifying line segments into one of at least a first set of line segments having common gradients and a second set of line segments having common gradients.

20. The information processing apparatus according to claim 16, wherein the line segments of the first set of line segments are orthogonal to the line segments of the second set of lines segments.

* * * * *